(12) United States Patent
Coronado et al.

(10) Patent No.: US 8,069,364 B2
(45) Date of Patent: Nov. 29, 2011

(54) METHOD TO RECOVER FROM LOGICAL PATH FAILURES

(75) Inventors: Juan Alonso Coronado, Tucson, AZ (US); Roger Gregory Hathorn, Tucson, AZ (US); Bret Wayne Holley, Tucson, AZ (US); Daniel J. Perkin, Tucson, AZ (US); Dinh Hai Le, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 12/179,869

(22) Filed: Jul. 25, 2008

(65) Prior Publication Data

US 2010/0023802 A1    Jan. 28, 2010

(51) Int. Cl.
    *G06F 11/00* (2006.01)
(52) U.S. Cl. .......................................................... 714/3
(58) Field of Classification Search .................... 714/43, 714/3, 5.1; 710/104
    See application file for complete search history.

(56) References Cited

U.S. PATENT DOCUMENTS

| | | | |
|---|---|---|---|
| 4,396,984 A | 8/1983 | Videki, II | |
| 4,455,605 A | 6/1984 | Cormier et al. | |
| 5,301,323 A | 4/1994 | Maeurer et al. | |
| 5,420,988 A | 5/1995 | Elliott | |
| 5,465,355 A | 11/1995 | Cook et al. | |
| 6,606,630 B1 * | 8/2003 | Gunlock | 1/1 |
| 6,952,734 B1 * | 10/2005 | Gunlock et al. | 709/227 |
| 7,181,553 B2 * | 2/2007 | Pooni et al. | 710/38 |
| 7,210,068 B1 * | 4/2007 | Aiello et al. | 714/43 |
| 7,653,769 B2 * | 1/2010 | Fisher et al. | 710/104 |
| 2003/0023893 A1 * | 1/2003 | Lee et al. | 714/4 |
| 2003/0172331 A1 | 9/2003 | Cherian et al. | |
| 2004/0098637 A1 * | 5/2004 | Duncan et al. | 714/6 |
| 2006/0242156 A1 | 10/2006 | Bish et al. | |

* cited by examiner

*Primary Examiner* — Scott Baderman
*Assistant Examiner* — Yair Leibovich
(74) *Attorney, Agent, or Firm* — Hamilton & Terrile, LLP; Stephen A. Terrile (57) ABSTRACT

A system and method for recovering from logical path failures is set forth. More specifically, when a host detects a logical path failure, the host enters a path discovery mode of operation. If the host continues to detect a logical path failure while operating in the logical path discovery mode of operation, the host removes the logical path from a logical path mask, and the host does not use the removed logical path again. Additionally, the system and method facilitates recovery of the failed logical paths by using a plurality of logical path masks. A first mask is referred to as an intermediate failure logical path mask and a second mask is referred to as a permanent failure logical path mask.

20 Claims, 6 Drawing Sheets

METHOD TO RECOVER FROM LOGICAL PATH FAILURES

BACKGROUND OF THE INVENTION

1. Field of the Invention

The present invention relates to a method, system, and article of manufacture for recovering from grouped logical path failures.

2. Description of the Related Art

In certain computing environments, a host computer may communicate with a storage control unit, where the storage control unit controls physical storage. The physical storage that is controlled by the storage control unit may be represented logically as a plurality of logical path resources within the storage control unit. Applications in the host computer may perform input/output (I/O) operations with respect to the logical path resources of the storage control unit. For example, an application in the host computer may write to logical path resources of the storage control unit. The storage control unit may maintain a correspondence between the logical path resources and storage media in the physical storage via logical and physical volumes. While data may be physically written to the storage media in the physical storage under the control of the storage control unit, as far as an application in the host computer is concerned, the application performs write operations with respect to the logical path resources in the storage control unit.

Logical path resources may be added, deleted, or otherwise modified within the storage control unit. Certain modifications to the logical path resources of the storage control unit, such as addition of a logical path resource when no path resources are available, may cause a failure of I/O operations that are sent from the host computer to the storage control unit.

It is known for a host to use logical paths to communicate with a storage controller. A host usually has multiple paths to access devices in a storage controller. The multiple path capability of a host comes into play after the host system performs an initial program load (IPL) operation, and the logical paths are grouped per each device in a logical subsystem. A host may group between two and eight logical paths to any given device of a logical subsystem of a storage controller.

As long as the logical paths are available during a host input/output (I/O) operation, there is no problem. However, if a logical path failure occurs, the host enters into a path failure mode of operation. A logical path failure can be temporary or permanent. A temporary logical path failure may last between a few milliseconds to one or two seconds. In certain systems, for direct connect links, any error that lasts less than one and a half seconds is considered to be a nonpermanent error. When a loss of a light condition is detected, the channel starts a timer. If the link returns to operational within 1.5 seconds, the logical paths associated with that link are not removed. For switched links, the time-out period is the time needed for the state change to be propagated to the host from the switch. The hosts, such as a system 390 type host, then wait for 2 seconds before removing logical paths from the available paths.

When a permanent logical path error is identified, this condition essentially lasts forever as far as the host is concerned. The consequence is thus removal of the logical path from the available logical paths. For direct connect links, if the link is in a failure condition for over one and half seconds, the channel removes all logical paths on that physical link. For switched links, the time-out period is approximately two seconds before the channel will begin removing logical paths.

One result of a temporary or permanent failure is an inability of a host to access devices via the failed logical path. Because the host does not have any knowledge of the failure type, the host retries the I/O operation. For temporary failures, the host might be able to retry the I/O operation successfully and the host can continue performing I/O operations to the device. For temporary failures or for permanent failures, a host may exceed a predetermined number of allowed retries within the failure window, and the host removes the logical path from its working logical path mask.

When a host detects a logical path failure, the host enters a path discovery mode of operation. If the host continues to detect a logical path failure while in the path discovery mode of operation, the host removes the logical path from its logical path mask, and the host does not use the logical path again. For each failure the host detects on a logical path, the host enters the path discovery mode of operation, and path removal from its mask if the logical path fails in the discovery process. It is possible, and it has been observed, that a loss of access to the device may occur because the host loses access to a device via all the logical paths of a path group. In a System 390 type environment this case is called boxed device.

In a zSeries type environment, if a boxed device occurs on a system pack (for example the IPL device), this condition can result in an outage for the host and can result in requiring another IPL operation. The IPL operation also clears the boxed device condition if paths are physically available. If not, the IPL operation fails and can result in an extended outage of the computing environment. If the boxed device occurs on an application volume, often the device must be unboxed manually by the operator and the application must be recovered. Unboxing a device can be accomplished on a z/OS type system via, e.g., a VARY PATH or VARY ON-LINE command if the paths are physically available.

SUMMARY OF THE INVENTION

In accordance with the present invention, a system and method for recovering from logical path failures is set forth. More specifically, when a host detects a logical path failure, the host enters a path discovery mode of operation. If the host continues to detect a logical path failure while operating in the logical path discovery mode of operation, the host removes the logical path from a logical path mask, and the host does not use the removed logical path again. Additionally, the system and method facilitates recovery of the failed logical paths by using a plurality of logical path masks. A first mask is referred to as an intermediate failure logical path mask and a second mask is referred to as a permanent failure logical path mask.

When a host detects a logical path failure, the host moves a logical path from its working mask to the intermediate failure mask. The logical path remains in the intermediate logical path mask until the host determines that it desires additional logical paths. Examples of reasons for desiring additional logical paths can include performance degradation, reaching a last logical path, completing an IPL operation and needing to group logical paths into a path group. When the host identifies a desire to recover a failed logical path, the host proceeds to a logical path discover operation for each logical path in the intermediate logical path mask. A logical path in the intermediate logical path that is successfully recovered is moved back to the working logical path mask. A logical path in the intermediate logical path that can not be recovered is moved to the permanent failure logical path.

By preventing the immediate removal of a logical path, the path group integrity is maintained. When the host recovers logical paths by moving a failed logical path from the intermediate mask to the working mask, the host does not have to perform a path disband and path group reestablishment operation. The path group disband and reestablish operation can be a time consuming process that has been observed to degrad performance among other effects.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

In the following description, reference is made to the accompanying drawings which form a part hereof and which illustrate several embodiments. It is understood that other embodiments may be utilized and structural and operational changes may be made.

Figure 1:
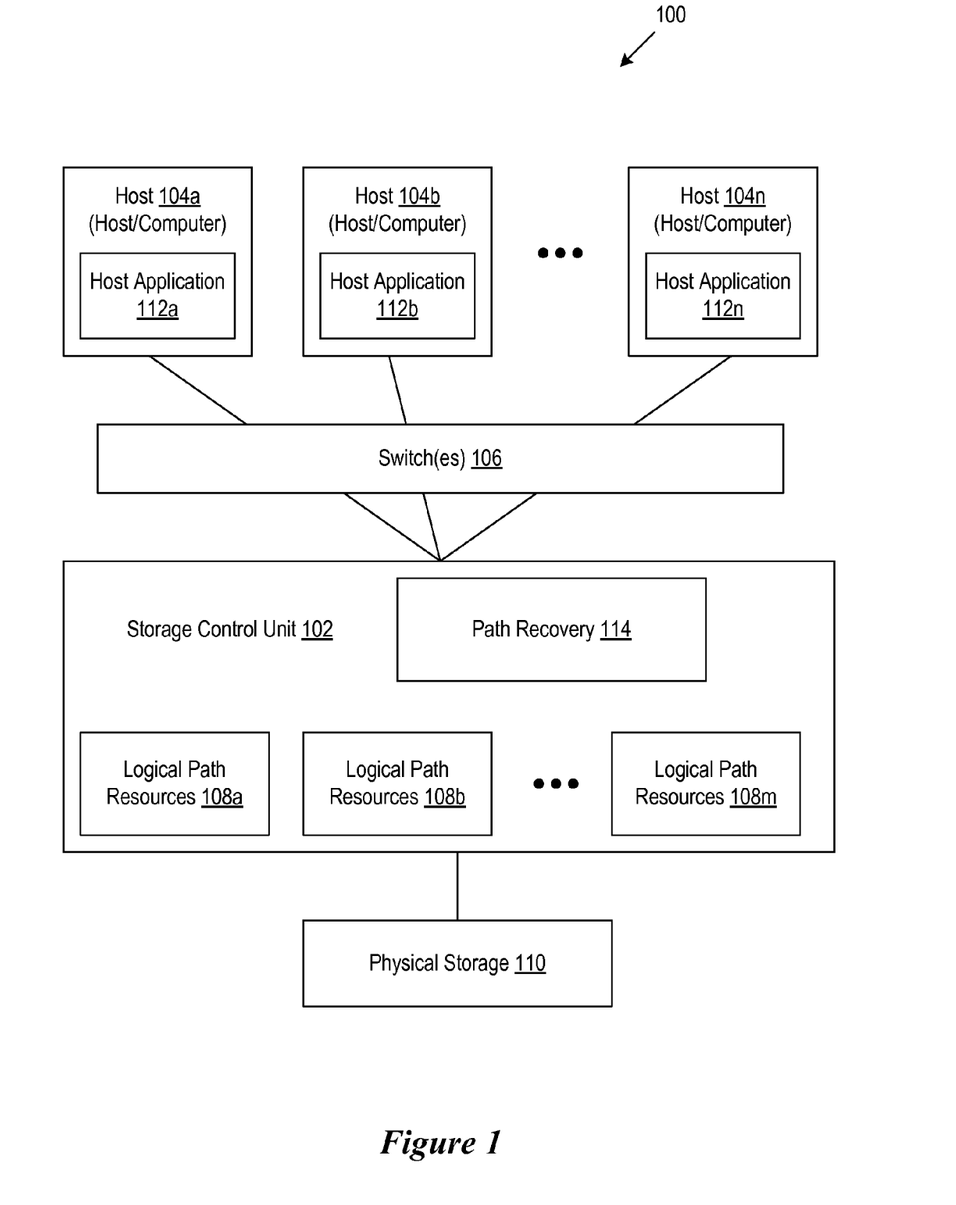
FIG. 1 illustrates a block diagram of a computing environment in accordance with certain embodiments.

FIG. 1 illustrates a block diagram of a computing environment 100 in accordance with certain embodiments of the present invention. The computing environment 100 includes a storage control unit 102 that is coupled to a plurality of hosts 104a, 104b . . . 104n over one or more switches 106. The storage control unit 102 includes logical path resources 108a, 108b . . . 108m that map to physical subsystems corresponding to a physical storage 110 that is controlled by the storage control unit 102. The plurality of hosts 104a . . . 104n include a plurality of host applications 112a, 112b . . . 112n that perform I/O operations with the logical path resources 108a . . . 108m.

The plurality of hosts 104a . . . 104n may comprise any suitable computational device including for example, a personal computer, a workstation, a mainframe, a hand held computer, a palm top computer, a telephony device, a network appliance, a blade computer, a storage server, etc. The storage control unit 102 may include any suitable computational device that controls access to the physical storage 110. The physical storage 110 may include any suitable data storage including for example disk drives, tape drives, etc. In certain embodiments, the one or more switches 106 that couple the plurality of hosts 104a . . . 104n to the storage control unit 102 may comprise Fiber Connectivity (FICON) switches. For example, FICON switches that use optical fiber technology may couple the hosts 104a . . . 104n comprising an IBM S/390 type computer or other computers to the storage control unit 102.

While FIG. 1 shows a single host application per host, in alternate embodiments a greater or a fewer number of host applications may execute in each host. Additionally, the number of host applications 112a . . . 112n that run off the plurality of hosts 104a . . . 104n may be different from the number of hosts 104a . . . 104n.

A configuration of logical path resources 108a . . . 108m in the storage control unit 102 may change because of additions, removals, or modifications to the logical path resources 108a . . . 108m. For example, an exemplary host, such as the host 104a, may establish communication with exemplary logical path resources, such as the logical path resources 108b. The logical path resources 108a . . . 108m may comprise any plurality of logical storage systems, where each logical storage system includes at least one logical storage volume corresponding to one or more physical volumes stored in the physical storage 110.

In certain embodiments, when a configuration change of the logical path resources 108a . . . 108m occurs within the storage control unit 102 that results in an out of resources condition, a path recovery application 114 implemented in the storage control unit 102 may be executed. The path recovery application 114 is also referred to as a path recovery system and may be implemented in software, hardware, firmware, or any combination thereof. Executing the path recovery application 114 allows replacing logical path resources within the computing environment 100. By executing the path recovery application 114, a host may recover a logical path when a failure is detected.

Figure 2:
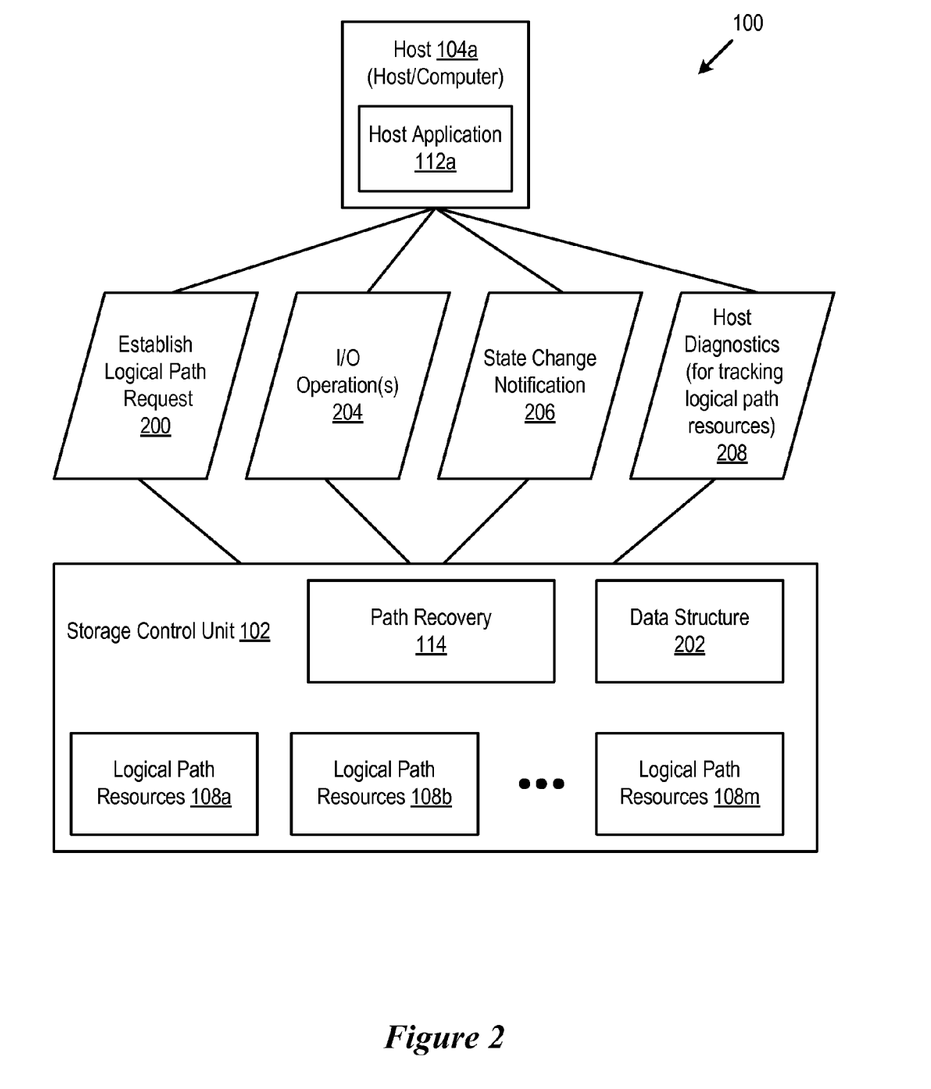
FIG. 2 illustrates a block diagram that shows how communications are preformed in the computing environment, in accordance with certain embodiments.

FIG. 2 illustrates a block diagram that shows how exemplary communications are performed in the computing environment 100, in accordance with certain embodiments. More specifically, an exemplary host 104a, selected from the hosts 104a . . . 104n, may include an exemplary host application 112a. The host application 112a may send an 'establish logical path' request 200 to the storage control unit 102, where the 'establish logical path' request 200 seeks to access a logical path resource 108a. . . 108m of the storage control unit 102. The path recovery application 114 or some other application implemented in the storage control unit 102 enables the storage control unit 102 to recover from a logical path failure.

Once a logical path between the host application 112a and a logical path resource has been established as a result of the successful completion of the 'establish logical path' request, the host application 112a may perform I/O operations 204 with respect to the logical path resources with which the logical path was established.

In certain embodiments, the configuration of the logical path resources 108a . . . 108m may change via additions, removals, or modifications to the logical path resources 108a . . . 108m. For example, new logical path resources may be added. If a host attempts to establish a logical path via an establish logical path message when no logical path resources are available, such an operation may result in generation of an out of resources condition. To prevent such an out of resources condition from occurring, in response to a change in the configuration of the logical path resources 108a . . . 108m, the path recovery application 114 may perform a path recovery operation.

Thus, the host application 112a can recover logical paths when a failure within a logical path is detected. More specifically, with the path recover application 114, although a host 104 has not grouped its logical paths, the host 104 knows which logical paths it has available. When a host 104 detects a logical path failure, the host enters a path discovery mode of operation. If the host 104 continues to detect a logical path failure while operating in the logical path discovery mode of operation, the host 104 removes the logical path from a logical path mask, and the host 104 does not use the removed logical path again. In the case of grouped logical paths, the host 104 aborts the loading process because the host 104 does not have more paths available to continue the loading process. Thus, the path recovery application 114 allows the host 104 to continue a loading process even if the host 104 fails to recover a failed logical path.

Additionally, in certain embodiments, a logical path remains in the intermediate logical path mask until and unless the host 104 determines that additional logical paths are desired. For example, additional logical paths may be desired due to completing IPL and needing to group logical paths into a path group. When the host 104 determines that recovery of the failed logical paths is desired, the host 104 performs a logical path discovery operation for each logical path in the intermediate logical path mask. A logical path in the intermediate logical that is successfully recovered is moved back to the working path group mask. A logical path in the intermediate logical path that cannot be recovered is moved to a permanent failure logical path.

Figure 3:
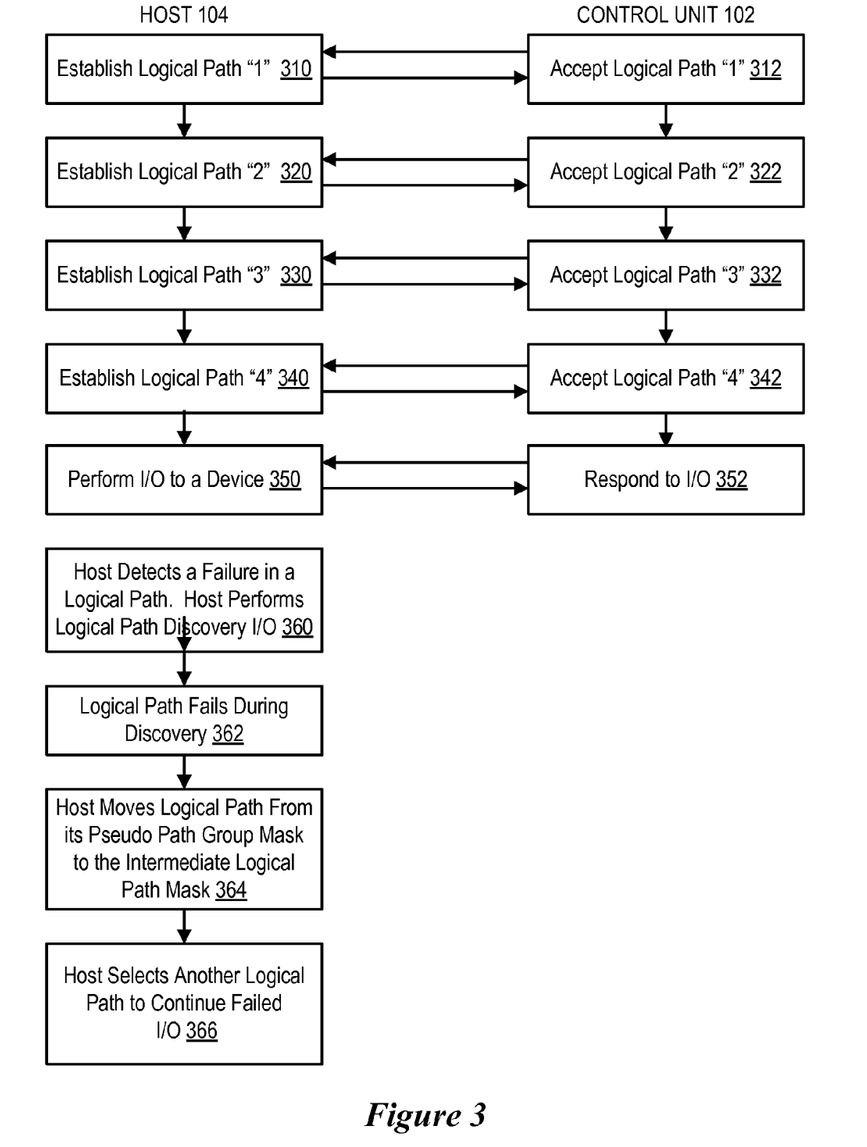
FIG. 3 shows a flow diagram of the operation of a system for recovering from grouped logical path failures, in accordance with certain embodiments.
Figure 4:
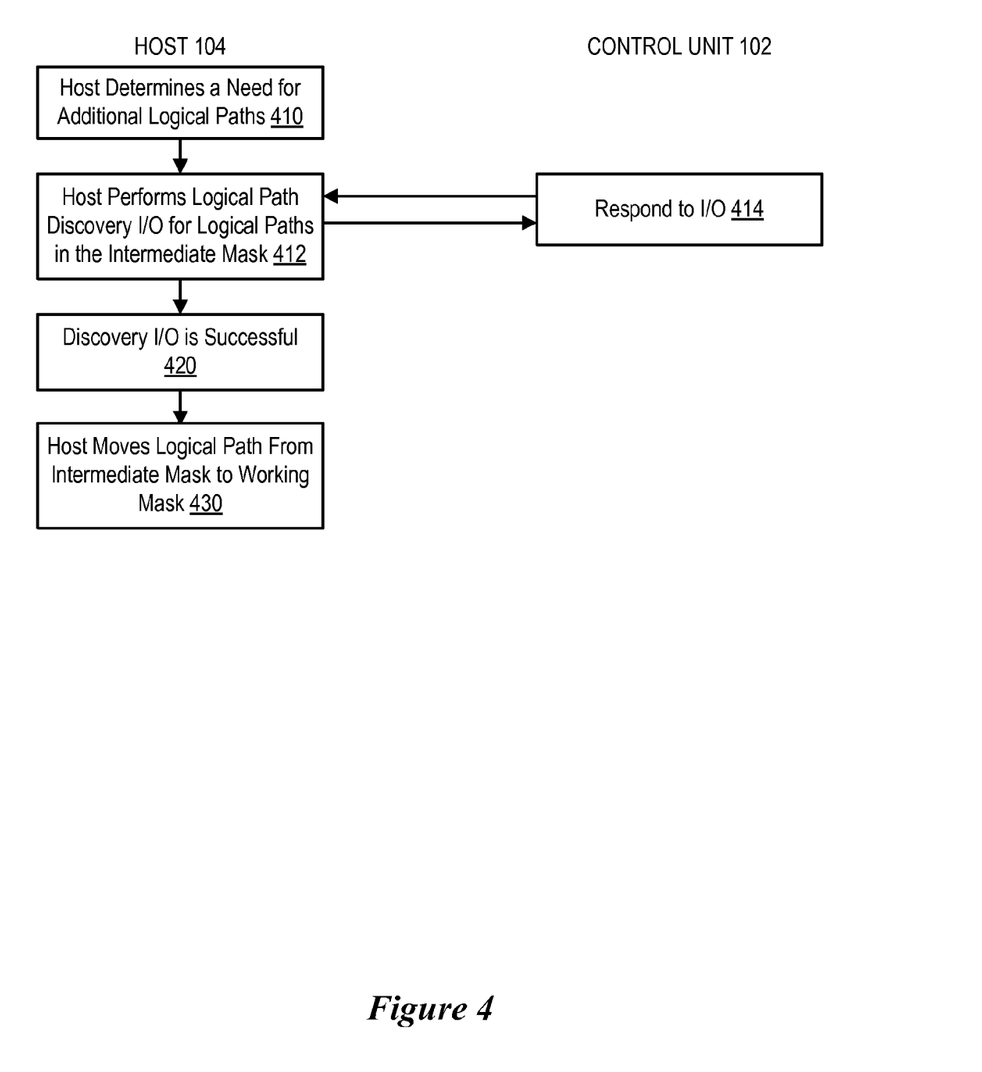
FIG. 4 shows a flow diagram of the operation of a system for recovering from grouped logical path failures, in accordance with certain embodiments.
Figure 5:
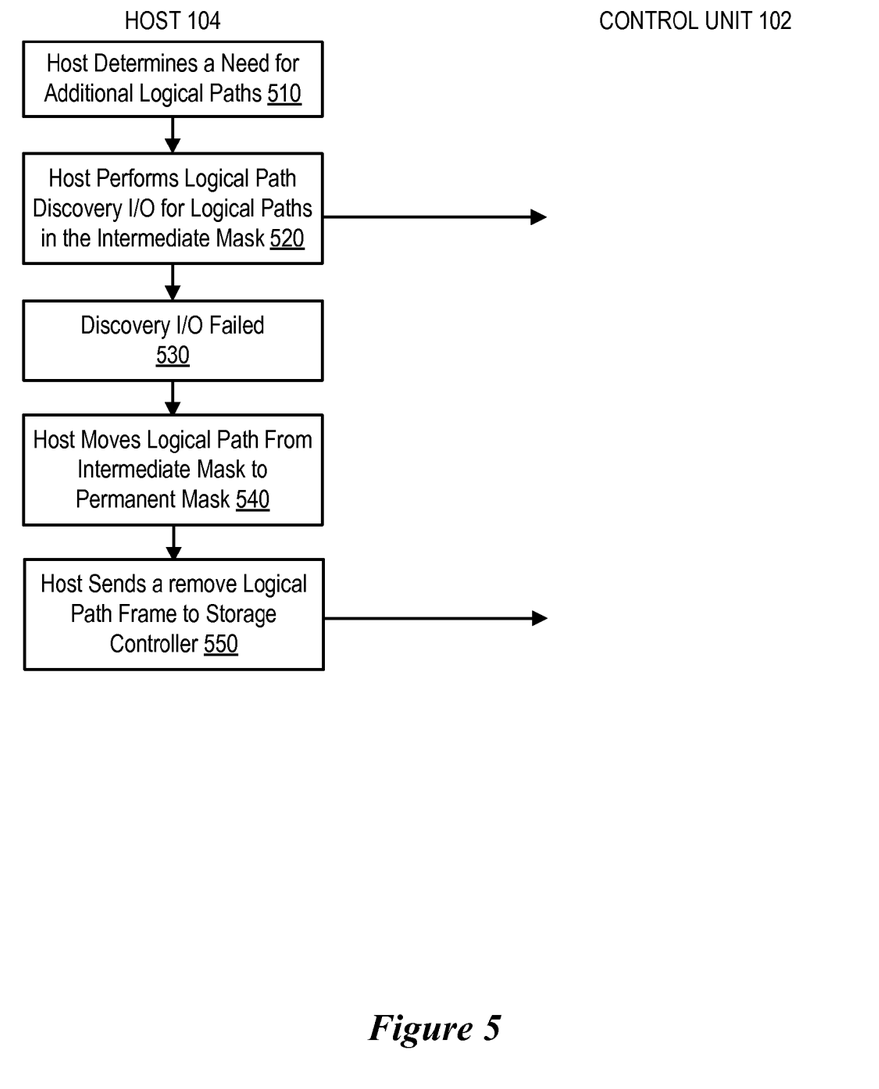
FIG. 5 shows a flow diagram of the operation of a system for recovering from grouped logical path failures, in accordance with certain embodiments; and, FIG. 6 illustrates a system in which certain embodiments are implemented.

FIG. 3-5 illustrate examples of operations performed by the path recovery application 114 in the storage control unit 102. In general, to recover a logical path, and to prevent a logical path failure, a host performs a plurality of operations.

More specifically, referring to FIG. 3, an example of operations performed by the path recovery application 114 when four logical paths are present and a logical path failure has been detected is shown. More specifically, in one embodiment, the host 104 sends an establish logical path (ELP) 1 message at step 310. Next, the control unit 102 accepts the establish logical path 1 message at step 312. Next the host 104 sends an establish logical path 2 message at step 320. Next, the control unit 102 accepts the establish logical path 2 message at step 322. Next the host 104 sends an establish logical path 3 message at step 330. Next, the control unit 102 accepts the establish logical path 3 message at step 332. Next the host 104 sends an establish logical path 4 message at step 340. Next, the control unit 102 accepts the establish logical path 4 message at step 342.

Next, the host 104 selects one path of the working path group and performs an input/output (I/O) operation to a device at step 350 and the control unit 112 responds to the I/O operation at step 352. If, based upon the response, the host 104 detects a failure within the logical path to which the I/O operation was directed, then the host 102 performs a logical path discovery I/O operation at step 360. If during the logical path discovery I/O operation the logical path to which discovery I/O operation is directed fails, as determined at step 362, then the host moves a logical path from the working path group mask to an intermediate logical path mask at step 364. The host 104 then selects another logical path from the working path group (i.e., the host replaces the logical path) to enable executing of the failed I/O operation at step 366.

Referring to FIG. 4, an example of operations performed by the path recovery application 114 when a host determines that recovery of a logical path is desirable and the host is able to recover logical paths is shown. When the host 104 detects a condition that will require accessibility to more logical paths, the host enters into the logical path recovery mode. In the logical path recovery mode of operation, the host 104 performs a logical path discovery operation for each logical path in the intermediate logical path mask. A logical path in the intermediate logical that is successfully recovered is moved back to the working logical path mask. A logical path in the intermediate logical path that cannot be recovered is moved to the permanent failure logical path.

More specifically, if the host 104 determines a need for additional paths at step 410, then the host 104 performs a logical path discovery I/O operation for logical paths that are include within the intermediate mask at step 412. The control unit 102 responds to the I/O operation at step 414. Based upon the response, the host determines that the discovery I/O operation was successful at step 420. Next, the host moves the logical path from the intermediate mask to the working path group mask at step 430.

Referring to FIG. 5, an example of operations performed by path recovery application 114 when a host 104 determines that recovery of logical paths is desirable and the host is unable to recover logical paths is shown. For logical paths in the permanent failure logical mask, the host will send a remove Logical path frame to the storage controller More specifically, when a host determines a need for additional logical paths at step 510, the host performs a logical path discovery I/O operation for logical paths in the intermediate mask at step 520. By the control unit 102 not responding to the discovery I/O operation, the host can determine that the discovery I/O operation failed at step 530. Net, the host 104 moves the logical path that caused the failed discovery I/O operation from the intermediate mask to the permanent mask at step 540. Next, the host sends a remove logical path frame indication to the storage controller 102 at step 550.

The described techniques may be implemented as a method, apparatus, or article of manufacture involving software, firmware, micro-code, hardware, and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information-bearing medium known in the art. For example, the article of manufacture comprises a storage medium having stored therein instructions that when executed by a machine results in operations being performed.

Figure 6:
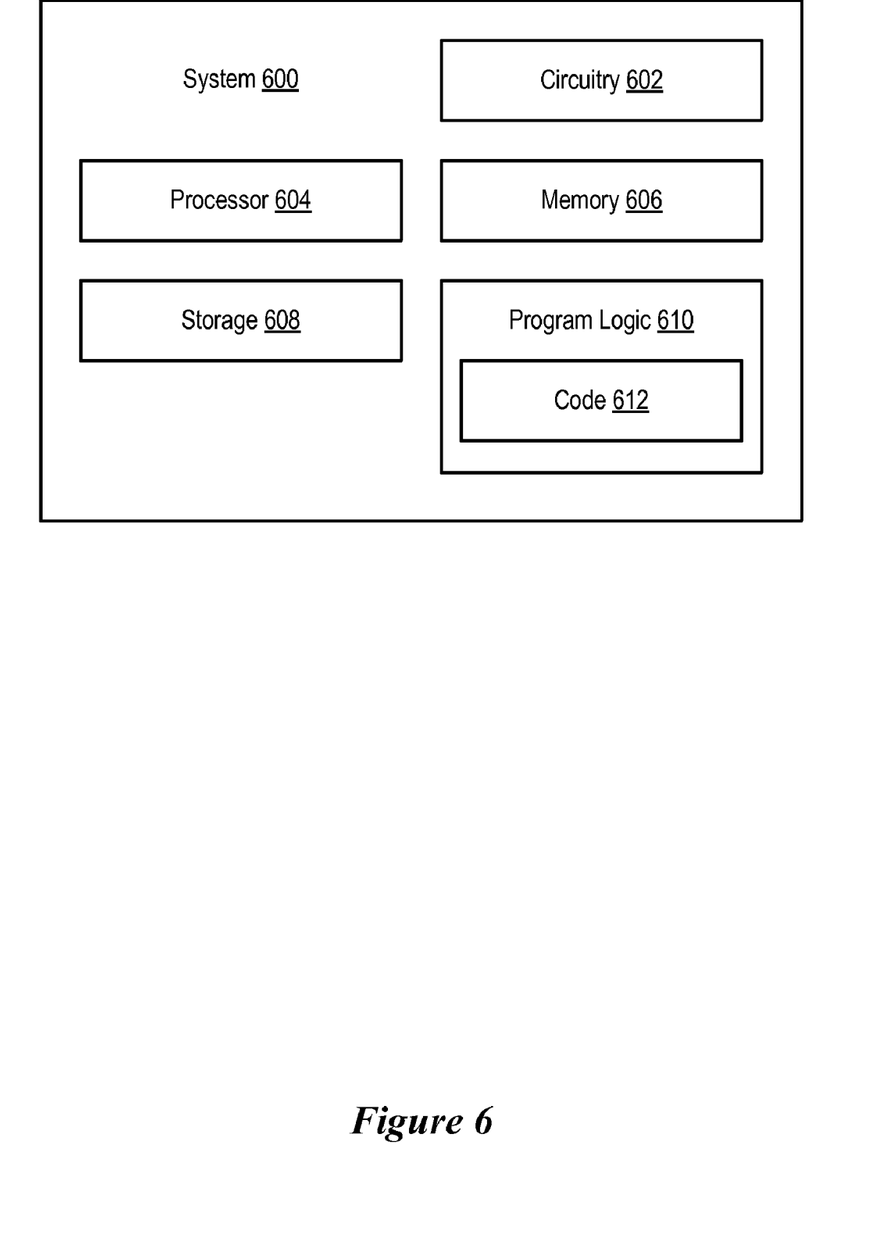

FIG. 6 illustrates a block diagram of a system 600 in which certain embodiments may be implemented. In certain embodiments, the storage control unit 102 and the hosts 104*a* . . . 104*n* may be implemented in accordance with the system 600. The system 600 may include circuitry 602 that may in certain embodiments include a processor 604. The system 600 may also include a memory 606 (e.g., a volatile memory device), and storage 608. Certain elements of the system 600 may or may not be found in the storage control unit 102 or the hosts 104a . . . 104n. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device, and/or a network accessible storage device. The system 600 may include program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 or the circuitry 602.

Certain embodiments may be directed to a method for deploying computing instruction by a person or automated processing integrating computer-readable code into a computing system, where the code in combination with the computing system is enabled to perform the operations of the described embodiments. In certain embodiments, different storage systems may be used in the computing environment, such as Redundant Array of Independent Disks (RAID), just a bunch of disks (JBOD), Direct Access Storage Device (DASD), tape, etc.

At least certain of the operations of FIGS. 2-5 may be performed in parallel as well as sequentially. In alternative embodiments, certain of the operations may be performed in a different order, modified, or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more, or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method for recovering from a logical failure comprising:
   detecting by a host a logical path failure of a first logical path in a storage control unit;
   entering a path discovery mode of operation upon detection of the logical path failure;
   performing a logical path recovery operation, the logical path recovery operation comprising:
   removing the logical path from a group of available logical paths and performing an establish a logical path operation after removing the logical path from the group of available logical paths;
   moving the logical path from the working path group logical mask to an intermediate failure mask upon detection of the logical path failure of a logical path identified within the working path group logical mask, the logical path remaining in the intermediate logical path mask until and unless it is determined that additional logical paths are desired;
   selecting another logical path to continue operation;
   determining a need for additional logical paths;
   performing logical path discovery for each of the logical paths in the intermediate mask;
   moving a logical path from the intermediate mask to the working mask wherein the host need not perform a path disband and path group reestablishment operation.

2. The method of claim 1 wherein:
   the detecting the logical path failure occurs in response to an establish logical path operation.

3. The method of claim 1 wherein:
   the group of available logical paths are identified within a logical path mask; and
   the removing the logical path from a group of available logical path comprises removing an identification of the logical path from the logical path mask.

4. The method of claim 1 further comprising:
   creating a working path group for grouped logical paths; and,
   when performing an initial program load process for a logical path not requiring a group of logical paths, using the working path group to perform the initial program load process.

5. The method of claim 4 further comprising:
   identifying the working path group of logical paths within a working path group logical mask.

6. The method of claim 1 further comprising:
   moving a logical path from the intermediate failure mask to a permanent failure mask upon detection of a logical path failure of the logical path identified within the intermediate failure mask if it is determined that additional logical paths are desired and access to the intermediate failure mask produces the logical path failure of the logical path identified within the intermediate failure mask.

7. A system comprising:
   a processor; and,
   a computer-usable medium embodying computer program code, the computer program code comprising instructions executable by the processor and configured for:
   detecting by a host a logical path failure of a first logical path in a storage control unit;
   entering a path discovery mode of operation upon detection of the logical path failure;
   performing a logical path recovery operation, the logical path recovery operation comprising
   removing the logical path from a group of available logical paths and performing an establish a logical path operation after removing the logical path from the group of available logical paths;
   moving the logical path from the working path group logical mask to an intermediate failure mask upon detection of the logical path failure of a logical path identified within the working path group logical mask, the logical path remaining in the intermediate logical path mask until and unless it is determined that additional logical paths are desired;
   selecting another logical path to continue operation;
   determining a need for additional logical paths;
   performing logical path discovery for each of the logical paths in the intermediate mask;

moving a logical path from the intermediate mask to the working mask wherein the host need not perform a path disband and path group reestablishment operation.

8. The system of claim 7 wherein:
the detecting the logical path failure occurs in response to an establish logical path operation.

9. The system of claim 7 wherein:
the group of available logical paths are identified within a logical path mask; and
the removing the logical path from a group of available logical path comprises removing an identification of the logical path from the logical path mask.

10. The system of claim 7 wherein the computer program code further comprises instructions for:
creating a working path group for grouped logical paths; and, wherein
when performing an initial program load process for a logical path not requiring a group of logical paths, using the working path group to perform the initial program load process.

11. The system of claim 10 wherein the computer program code further comprises instructions for
identifying the working path group of logical paths within a working path group logical mask.

12. The system of claim 11 wherein the computer program code further comprises instructions for
moving a logical path from the intermediate failure mask to a permanent failure mask upon detection of a logical path failure of the logical path identified within the intermediate failure mask if it is determined that additional logical paths are desired and access to the intermediate failure mask produces the logical path failure of the logical path identified within the intermediate failure mask.

13. A tangible computer-usable storage medium embodying computer program code, the computer program code comprising computer executable instructions configured for:
detecting by a host a logical path failure of a first logical path in a storage control unit;
entering a path discovery mode of operation upon detection of a logical path failure;
performing a logical path recovery operation, the logical path recovery operation comprising
removing the logical path from a group of available logical paths and performing an establish a logical path operation after removing the logical path from the group of available logical paths;
moving the logical path from the working path group logical mask to an intermediate failure mask upon detection of the logical path failure of a logical path identified within the working path group logical mask, the logical path remaining in the intermediate logical path mask until and unless it is determined that additional logical paths are desired;
selecting another logical path to continue operation;
determining a need for additional logical paths;
performing logical path discovery for each of the logical paths in the intermediate mask;
moving a logical path from the intermediate mask to the working mask wherein the host need not perform a path disband and path group reestablishment operation.

14. The tangible computer-usable storage medium of claim 13 wherein:
the detecting the logical path failure occurs in response to an establish logical path operation.

15. The tangible computer-usable storage medium of claim 13 wherein:
the group of available logical paths are identified within a logical path mask; and
the removing the logical path from a group of available logical path comprises removing an identification of the logical path from the logical path mask.

16. The tangible computer-usable storage medium of claim 13 wherein the computer program code further comprises instructions for:
creating a working path group for grouped logical paths; and, wherein
when performing an initial program load process for a logical path not requiring a group of logical paths, using the working path group to perform the initial program load process.

17. The tangible computer-usable storage medium of claim 16 wherein the computer program code further comprises instructions for
identifying the working path group of logical paths within a working path group logical mask.

18. The tangible computer-usable storage medium of claim 17 wherein the computer program code further comprises instructions for
moving a logical path from the intermediate failure mask to a permanent failure mask upon detection of a logical path failure of the logical path identified within the intermediate failure mask if it is determined that additional logical paths are desired and access to the intermediate failure mask produces the logical path failure of the logical path identified within the intermediate failure mask.

19. An apparatus for recovering from a logical path failure comprising:
means, executing on a computer system, for detecting a logical path failure of a first logical path in a storage control unit;
means, executing on the computer system, for entering a path discovery mode of operation upon detection of a logical path failure;
means, executing on the computer system, for performing a logical path recovery operation, the means for performing the logical path recovery operation comprising
means for removing the logical path from a group of available logical paths and performing an establish a logical path operation after removing the logical path from the group of available logical paths;
means, executing on the computer system, for moving the logical path from the working path group logical mask to an intermediate failure mask upon detection of the logical path failure of a logical path identified within the working path group logical mask, the logical path remaining in the intermediate logical path mask until and unless it is determined that additional logical paths are desired;
means for selecting another logical path to continue operation;
means for determining a need for additional logical paths;
means for performing logical path discovery for each of the logical paths in the intermediate mask;
means for moving a logical path from the intermediate mask to the working mask
wherein the host need not perform a path disband and path group reestablishment operation.

20. A storage control unit comprising:
a processor; and,
a path recover application, the path recovery application comprising instructions executable by the processor and configured for:

detecting a logical path failure of a first logical path in a storage control unit;
entering a path discovery mode of operation upon detection of a logical path failure;
performing a logical path recovery operation, the logical path recovery operation comprising
removing the logical path from a group of available logical paths and performing an establish a logical path operation after removing the logical path from the group of available logical paths;
moving the logical path from the working path group logical mask to an intermediate failure mask upon detection of the logical path failure of a logical path identified within the working path group logical mask, the logical path remaining in the intermediate logical path mask until and unless it is determined that additional logical paths are desired;
selecting another logical path to continue operation;
determining a need for additional logical paths;
performing logical path discovery for each of the logical paths in the intermediate mask;
moving a logical path from the intermediate mask to the working mask wherein the host need not perform a path disband and path group reestablishment operation.

* * * * *